(Model.)
D. E. HENDERSON.
GATE HINGE.
No. 250,916. Patented Dec. 13, 1881.
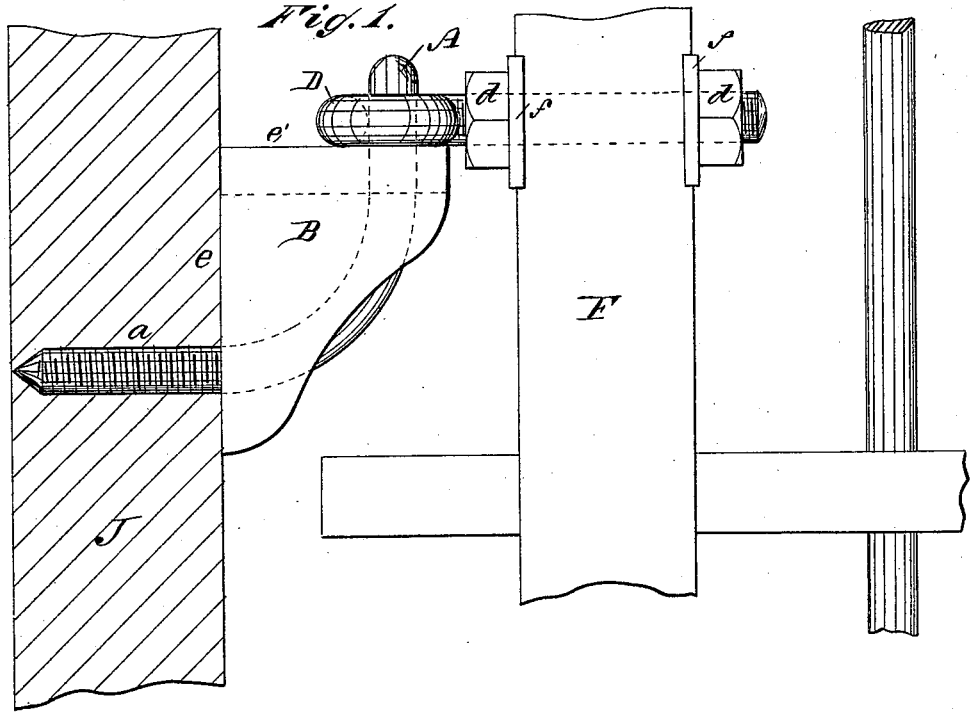
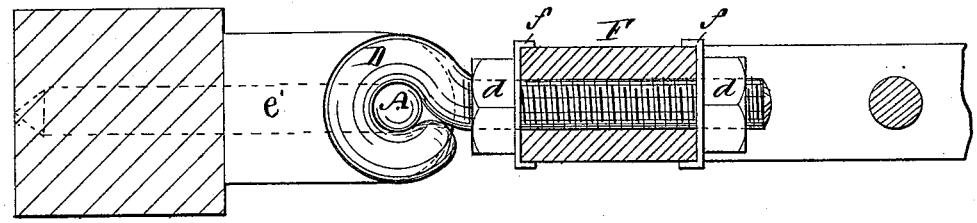
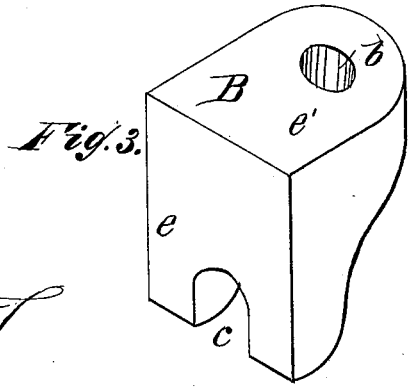
WITNESSES:
Theo. G. Hoster
C. Sedgwick
INVENTOR:
D. E. Henderson
BY Munn & Co.
ATTORNEYS.

UNITED STATES PATENT OFFICE.

DAVID E. HENDERSON, OF LEETOWN, WEST VIRGINIA.

GATE-HINGE.

SPECIFICATION forming part of Letters Patent No. 250,916, dated December 13, 1881.

Application filed October 19, 1881. (Model.)

*To all whom it may concern:*

Be it known that I, DAVID E. HENDERSON, of Leetown, in the county of Jefferson and State of West Virginia, have invented a new and Improved Gate-Hinge, of which the following is a full, clear, and exact description.

The object of my invention is to provide a hinge by means of which the gate or door hung by it may be adjusted; and it also consists of an improved hook and bracket upon which the gate or door is supported.

Reference is to be had to the accompanying drawings, forming part of this specification, in which similar letters of reference indicate corresponding parts in all the figures.

Figure 1 shows my improved hinge in side elevation. Fig. 2 shows the same in sectional plan, and Fig. 3 is a perspective view of the bracket.

The hook-bolt A is curved, as shown, and formed with the threaded portion $a$, which screws into the post J of the gate or the frame of the door, as the case may be. Upon the hook is placed the bracket B, which is formed with the hole $b$ for the upper end of the hook to pass through, and with the slot $c$, which straddles the hook at the point where the hook enters the post or casing, the slot in the bracket being so made that the weight will rest on the bolt at that point, and serves, by means of its right-angled faces $e\ e'$, to stiffen and strengthen the hook and support the gate or door at top and bottom upon the eyebolts D, as shown clearly in Fig. 1.

The eyebolts D are screw-threaded, as shown in Fig. 2, and are provided with the nuts $d\ d$ upon both sides of the bar F. Between the nuts and the bar F are placed the washers $f\ f$. By this means, upon changing the position of the nuts upon the eyebolts to or from the post J, the gate or door may be adjusted to or from said post; or it may be adjusted vertically, so as to line its outer edge to fit the jamb or post against which the outer edge of the gate or door swings.

Instead of having the eyebolts pass through the bar F, as shown in the drawings, in some instances I propose to provide a casting formed with suitable perforated lugs for the passage of the eyebolts, the casting being adapted to be secured to the door or gate by means of screws, and in some instances this casting and the nut will be made ornamental, and an ornamental cap may be provided for the upper end of the hook-rods, adapted to rest upon the upper face, $e'$, of the bracket B over the upper ends of the rods and bracket and to protect and ornament the hinge. The bracket B, by receiving the screw A in its hole and slot, prevents any lateral movement of said screw, as well as forms a broad support for the eye of screw D, so as to prevent sagging.

Having thus fully described my invention, I claim as new and desire to secure by Letters Patent—

1. The gate-hinge herein shown and described, consisting of the eyebolts D, provided with the nuts $d\ d$, in combination with the curved hook-bolts A and the brackets B, substantially as and for the purposes set forth.

2. The brackets B, formed with the hole $b$ for the passage of the end of the curved bolt, and with the slot $c$ and right-angled faces $e$ and $e'$, substantially as and for the purposes described.

DAVID E. HENDERSON.

Witnesses:
 WM. J. ROBERTS,
 JOHN MUSGROVE.